(12) United States Patent
Damour

(10) Patent No.: US 9,937,564 B2
(45) Date of Patent: Apr. 10, 2018

(54) METHOD AND DEVICE FOR PRODUCING A FRICTION BEARING OR A PART THEREOF

(71) Applicant: FEDERAL-MOGUL WIESBADEN GMBH, Wiesbaden (DE)

(72) Inventor: Philippe Damour, La Trinte sur Mer (FR)

(73) Assignee: Federal-Mogul Wiesbaden GmbH, Wiesbaden (DE)

( * ) Notice: Subject to any disclaimer, the term of this patent is extended or adjusted under 35 U.S.C. 154(b) by 0 days.

(21) Appl. No.: 14/647,188

(22) PCT Filed: Nov. 6, 2013

(86) PCT No.: PCT/EP2013/073123
§ 371 (c)(1),
(2) Date: May 26, 2015

(87) PCT Pub. No.: WO2014/079685
PCT Pub. Date: May 30, 2014

(65) Prior Publication Data
US 2015/0306680 A1     Oct. 29, 2015

(30) Foreign Application Priority Data
Nov. 26, 2012 (DE) ........................ 10 2012 221 537

(51) Int. Cl.
*B23B 41/12*      (2006.01)
*F16C 17/02*      (2006.01)
(Continued)

(52) U.S. Cl.
CPC .............. *B23B 41/12* (2013.01); *F16C 17/02* (2013.01); *F16C 17/10* (2013.01); *F16C 17/102* (2013.01);
(Continued)

(58) Field of Classification Search
CPC ........ B23B 4/12; F16C 33/14; F16C 2322/39; Y10T 29/49636; Y10T 29/49707
See application file for complete search history.

(56) References Cited

U.S. PATENT DOCUMENTS

2011/0080673 A1* 4/2011 Aoshima ................ B21D 53/10
360/224
2013/0216162 A1 8/2013 Hikita et al.

FOREIGN PATENT DOCUMENTS

DE        3905450 A1    8/1989
DE       101 63 292 A1  7/2002
(Continued)

*Primary Examiner* — Jermie Cozart
(74) *Attorney, Agent, or Firm* — Robert L. Stearns; Dickinson Wright, PLLC

(57) ABSTRACT

A method for producing a friction bearing or a part, particularly half thereof, is provided. While machining the entire width of an inner surface, both the radial extension and also the advance in the axial direction of at least one tool are changed during machining. A device for machining friction bearings or parts, particularly halves thereof, is also provided. The device has a spindle and at least one cutting tool, the radial extension and advance of which can be changed during machining. In a friction bearing or part, particularly a half thereof, slots or grooves are formed running in the peripheral direction. The depth and width of the grooves are designed to be larger in at least one axial edge area.

10 Claims, 2 Drawing Sheets

(51) Int. Cl.
  *F16C 33/04*    (2006.01)
  *F16C 33/14*    (2006.01)
  *F16C 17/10*    (2006.01)
(52) U.S. Cl.
  CPC ............ *F16C 33/04* (2013.01); *F16C 33/046* (2013.01); *F16C 33/14* (2013.01); *F16C 2220/60* (2013.01); *F16C 2240/42* (2013.01); *Y10T 29/49636* (2015.01)

(56) References Cited

FOREIGN PATENT DOCUMENTS

| | | |
|---|---|---|
| DE | 102005011371 A1 | 10/2005 |
| DE | 102005011372 A1 | 10/2005 |
| DE | 102005023309 A1 | 11/2006 |
| DE | 102006050246 A1 | 4/2008 |
| DE | 102010031606 A1 | 1/2012 |
| EP | 1584828 B1 | 2/2013 |
| GB | 2485807 A | 5/2012 |
| JP | H1076411 A | 3/1998 |
| JP | 2002048132 A | 2/2002 |
| JP | 2003 269454 A | 9/2003 |
| WO | 2002060301 A1 | 8/2002 |
| WO | WO 2007/088197 A1 | 8/2007 |
| WO | 2012060301 A1 | 5/2012 |

\* cited by examiner

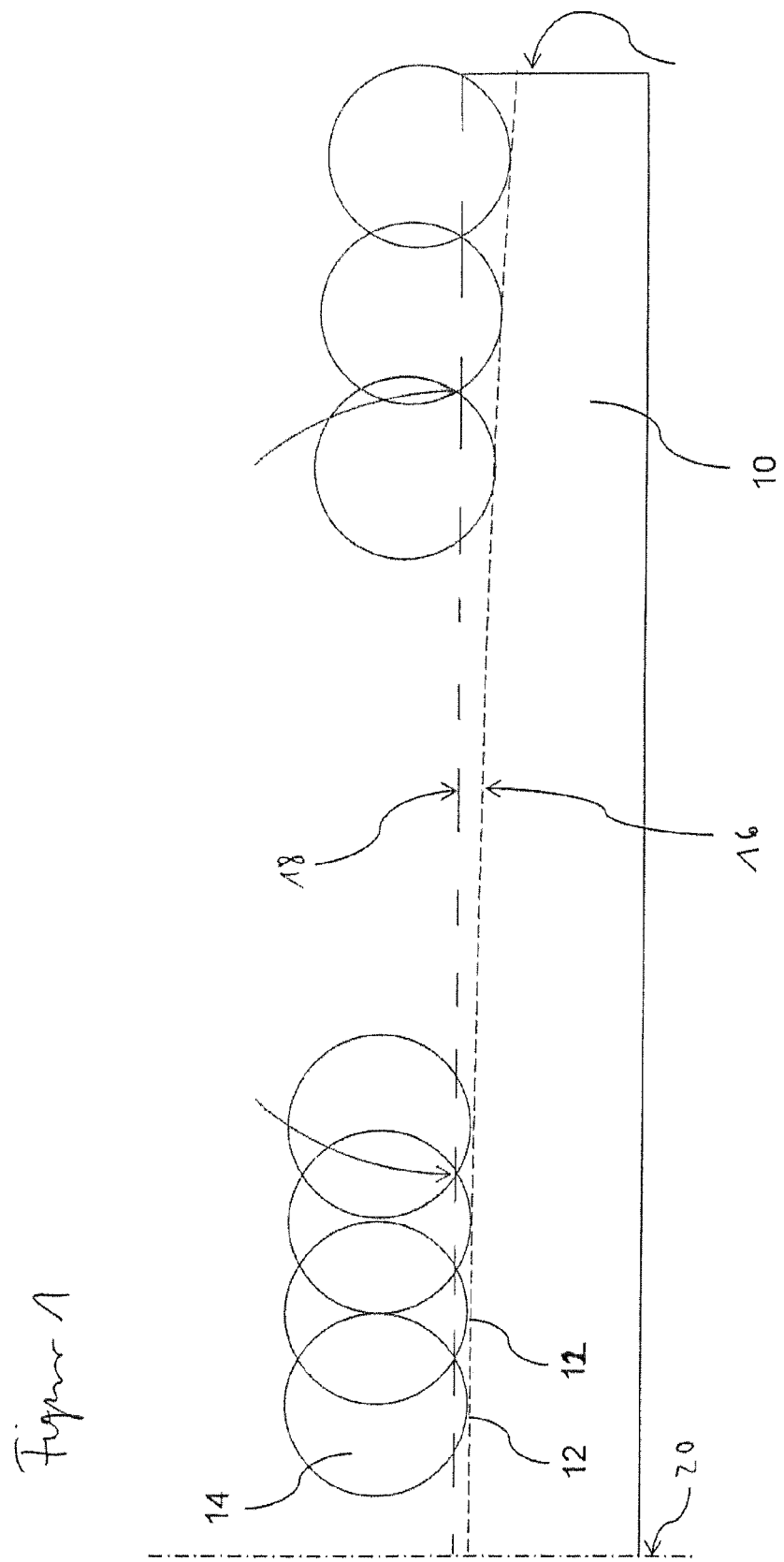

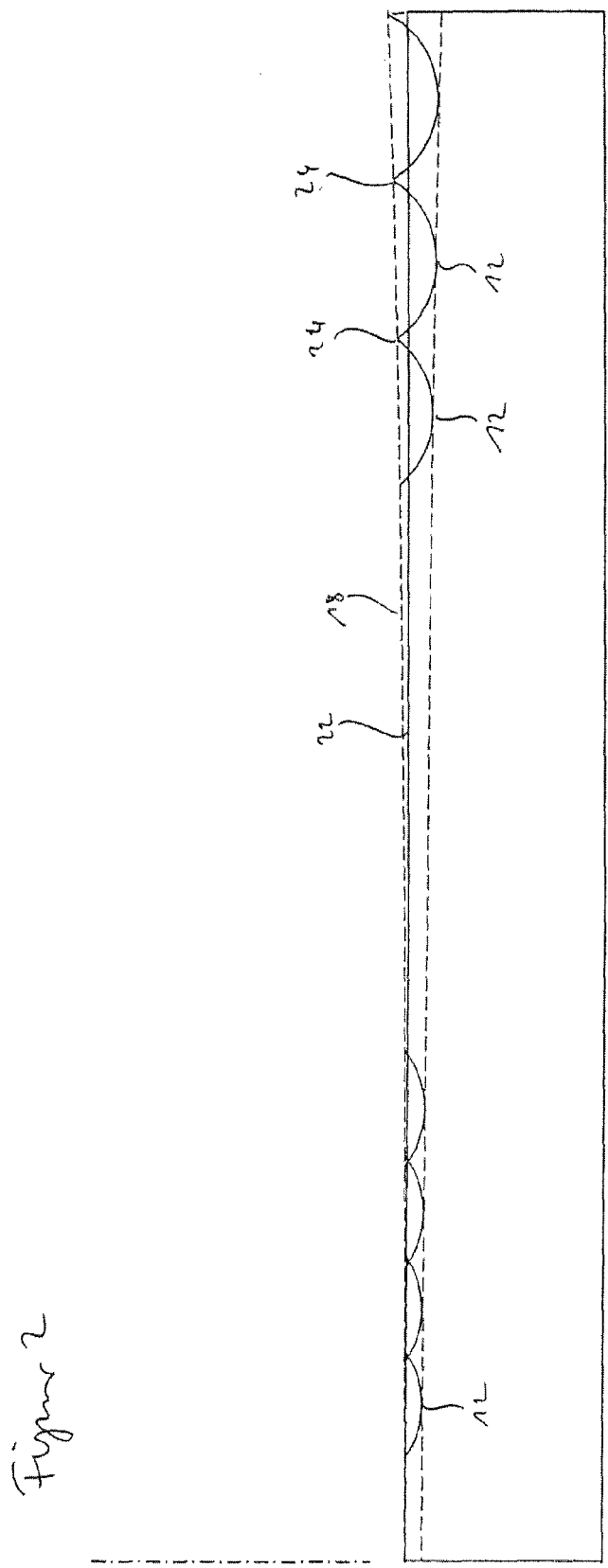

METHOD AND DEVICE FOR PRODUCING A FRICTION BEARING OR A PART THEREOF

BACKGROUND OF THE INVENTION

1. Technical Field

The invention relates to a method and a device for producing a friction bearing or a part thereof, and a friction bearing or a part thereof.

2. Related Art

In the field of friction bearings, it is known, for example from DE 10 2005 011 371 A1, to provide a friction bearing half, viewed in the circumferential direction, with deeper slots towards the edges. According to DE 10 2005 011 372 A1, this can be combined with a change in the depth of the slots in the axial direction. Finally, slots extending in the circumferential direction are evident from JP 2003-269454 A, which are either deeper or wider towards the axial edges. There is no production method given for this, and therefore it remains unclear how this configuration is supposed to be producible.

A hydrodynamic friction bearing is known from DE 10 2006 050 246 A1, which has first grooves and second grooves, wherein the second grooves are deeper and the depth thereof varies in the circumferential direction. During production, the friction bearing is subjected to two machining by rotation.

SUMMARY OF THE INVENTION

The invention is based on the object of providing an efficient production method and a corresponding device for a friction bearing or a part thereof, and an improved friction bearing (part).

Essentially in accordance with the abovementioned prior art, the inner surface is machined with the method according to the invention in that a tool circulates at a certain feed rate in the direction of the axis of the friction bearing and of a certain radial extension and thus generates numerous, directly adjacent slots or grooves between which, at least to a lesser extent, strips remain. The enlargement of the radial extension of the tool during machining as described below manifests itself, for example, in that a line, viewed in the longitudinal section containing the friction bearing axis, connects the deepest points or bottoms of the slots, is no longer parallel to the friction bearing axis.

Consequently, for producing a friction bearing or a part, in particular a half thereof, during machining, the radial extension and an axial feed rate of at least one tool are changed during machining of the inner surface along the entire width thereof. The tool can be, for example, a "bit" provided on a drilling spindle. This can be configured, for example, from a polycrystalline diamond. The change of the radial extension during machining means that in order to change this radial extension the tool must not be removed from the bearing (part) to be machined. On the contrary, during machining and in particular while this is rotating, the radial extension is changed in certain areas, for example at least in an axial edge area, to change the remaining wall thickness of the bearing without necessarily changing the depth of the slots formed. This applies, for example, to areas in which only the radial extension of the tool is changed and not the feed rate in the axial direction. By this, an advantageous friction bearing (part) can be produced in an efficient manner. By the possibility according to the invention to change both the radial extension and the feed rate during machining, not only can the wall thickness of the bearing be reduced, as was mentioned above, but also the depth and width of the slots formed can be changed, in particular increased. In particular, the slots or grooves formed by this in the inner surface of the friction bearing can be changed both along the entire circumference and also only in certain circumferential areas.

This tool can also be a laser beam or water beam. In this case, the depths with which the slots or grooves are formed are meant by the "radial extension" of such beams. It must thus be emphasized that such "tools" also realize the invention in that during machining and thereafter they allow only in certain axial and/or circumferential areas varying depths and/or widths to be formed in the slots or grooves.

It is additionally provided in an advantageous manner that during machining the feed rate in the axial direction changes. Preferably, this is increased in particular in at least one axial edge area. By this, deeper and wider slots can be combined in an advantageous manner in at least one, preferably both, axial edge areas with a configuration of the strips remaining between the slots, which occurs as a result of the increase of the feed rate to the effect that these strips are higher compared to the strips remaining with a lower feed rate.

In other words, the tips of the strips formed between the slots or grooves are still located, viewed in the longitudinal section, on a surface line which to a great extent is parallel to the axis of the friction bearing (cf. FIG. 1). However, the slots become deeper owing to the enlargement of the radial extension of the tool, and in particular in the edge areas a line connecting the "bottoms" of the slots in the cross section slopes towards the edge. Higher strips remain in particular in these areas, which are subjected to increased wear and/or are at least slightly "compressed" preferably only in the edge areas where the shaft, as a component supported by the bearing, applies a corresponding load. By this, a convex shape is formed which, viewed in the longitudinal section, contains the friction bearing axis. This effect only occurs, however, as was mentioned, in the particularly loaded edge areas, and the strips remaining in both this area and the center areas are still so high that they essentially abut the (loaded) shaft and the oil leakage is kept within acceptable limits.

To reduce the oil leakage even further, the invention also offers the possibility to enlarge the radial extension of the tool and also to increase the feed rate in the axial direction so comprehensively that a surface line, on which the tips of the strips remaining between the slots are located, is no longer parallel to the axis of the friction bearing but instead increases towards one or both edge areas (cf. FIG. 2). As regards the tips of the strips, a concave shape results which reduces the oil leakage. By the wear and abrasion of the strips, however, these are at least partially leveled such that the "flattened" strips are located on a convex shape which reduces the edge load in the load area such that an advantageous bearing is formed. The described wear is in regard to approximately semi-circular zones, as viewed in the developed view of the bearing, i.e. in particular towards both edges, the widest point of said cones coincides approximately with the respective edge of the bearing.

If the extent to which the strips are higher is, however, less than the enlargement of the radial extension of the tool, as a whole the desired convex shape results with "sloping" edge areas. The friction properties of the bearing can be improved by this. It is additionally mentioned that by the measures according to the invention individual profiles satisfying the requirements, i.e. "customized" profiles, for example trumpet-shaped profiles, can be generated in a random manner in the axial direction. These shapes can apply to the line which, viewed in the longitudinal section, connects the tips of the strips and/or to the line which connects the bottoms of the slots. In particular, the profile can be formed either convex or concave over the (axial) bearing width and/or it can have individual convex and/or concave zones. This applies in the same manner to the circumferential direction.

For certain applications, there are advantages if the radial extension and the feed rate in the axial direction are changed at least at times simultaneously since by this a particular flexibility can be used when configuring the friction bearing.

Nevertheless, it can also be advantageous in certain situations if the radial extension and the feed rate are changed at least at times successively.

The machining proves to be particularly efficient and precise if the radial extension and/or the feed rate is changed at least at times with each rotation of the tool. By this, in an advantageous manner a plurality of slots arranged one next to the other in the axial direction and extending in the circumferential direction can each be provided with an individual depth and/or width. As regards this depth, the remaining material thickness is to be considered, which becomes less owing to the enlargement of the radial extension of the tool during the (inner) machining of the bearing. Regarding the strips remaining between the slots, for example with a largely circular tool, the slots remain just as deep. As mentioned, the reduction of the remaining material thickness due to the enlargement of the radial extension of the tool can be compensated to a certain extent by an increase of the feed rate in the axial direction such that the remaining strips are higher and the slots are thus also "deeper".

As mentioned, it is preferred at this time that the radial extension and/or the feed rate of the tool is increased during machining of at least one axial edge area.

In first tests, it proved advantageous for the configuration of the slots or grooves in a central area, i.e. an area away from both edges, having a depth of approximately 1.7 μm to 2.1 μm and in particular approximately 1.9 μm, and having a depth of the slots of 5.6 μm to 6.0 μm, in particular approximately 5.8 μm, in at least one axial edge area.

For the feed rate, in other words the width or the central distance of individual slots, approximately 0.27 mm to 0.31 mm is provided for the central area and/or approximately 0.49 mm to 0.53 mm for at least one axial edge area. In particular, approximately 0.29 mm and approximately 0.51 mm are preferred, respectively.

In an advantageous manner, the friction bearing can be subsequently coated by a galvanic process, PVD, sputtering, by a polymer lacquer or in another suitable manner with a thin sliding layer and/or protective layer. With regard to the dimensions given above and below, reference is to be made to the fact that these apply to the machined inner surface before a coating.

The solution to the abovementioned object is furthermore carried out in that a spindle and at least one cutting tool are provided, which can be changed during machining with regard to its radial extension and/or the feed rate. Preferred further developments of the device according to the invention essentially correspond to the preferred embodiments of the method according to the invention. In this regard, the tool can contain at least one piezo element and/or consist of a polycrystalline diamond to realize the function described above. This can furthermore be realized by a mechanism having a rocker arm and rod which run on a so-called master. A further alternative consists of a suitable hydraulic control of a cutting tool. The tool can furthermore have, viewed in a plane which contains the rotation axis of the tool, a radius at the tip of approximately 5.4 mm to 5.8 mm, in particular approximately 5.6 mm, in other words in the area in which the machining of the friction bearing or part thereof occurs.

The solution to the abovementioned object is also solved by the friction bearing (part), in which grooves extending in the circumferential direction are configured deeper and wider in at least one axial end area. Preferred further developments of the friction bearing (part) according to the invention essentially correspond to the products of the embodiments of the method described above and below, as well as the products which can be produced by the devices described above and below. It is furthermore mentioned that any feature which is mentioned only in connection with the method, the device or the friction bearing (part) alone can also be applied to each of the other subject matters of the application.

BRIEF DESCRIPTION OF THE DRAWINGS

Embodiment examples of the invention will be explained below in more detail with reference to the figures which show in FIGS. 1 and 2 schematic diagrams of two procedures during machining of a friction bearing (part).

DETAILED DESCRIPTION OF PREFERRED EMBODIMENTS OF THE INVENTION

In FIG. 1 a cross-section through a friction bearing half 10 is shown with the view towards the circumference. Here, only an axial edge is represented (the area to the right of a central plane 20 according to FIG. 1). On the (upper) bearing surface of the friction bearing, slots or grooves 12 extend essentially perpendicular to the plane of the drawing, which extend in the circumferential direction and are formed by a suitable, schematically-shown tool 14. The tool rotates essentially about an axis which according to FIG. 1 runs from left to right and accordingly has, as can be seen in FIG. 1, a radius in a plane that contains this axis. This radius essentially defines the shape of the grooves 12 formed. Further, the radial extension of the tool 14 defines the depth of the slots or grooves 12 in the direction of the friction bearing part 10. As can be seen in FIG. 1, this is less in an axial central area (on the left in FIG. 1) than in an axial outer area (on the right in FIG. 1).

Further, in the embodiment shown the feed rate between these areas is changed. In other words, the grooves are formed with a smaller width in the central area and are thus formed comparatively close together. As is indicated in the area on the right in FIG. 1, the feed rate is increased towards the axial edge such that the width of the slots becomes greater. According to the invention, the radial extension of the tool and preferably also the feed rate can be changed in the described manner without having to interrupt the machining on the friction bearing part 10. It is furthermore evident from FIG. 1 as a preferred measure that the depth of the grooves is continually increased starting from the central area to the axial edge. In other words, the bottoms of the grooves are located on a surface line 16 which is not parallel to the friction bearing axis or to the surface line 18 also shown which connects the tips of the strips, but instead slopes towards the edge. It can be seen that the remaining material thickness is reduced by this, however the strips remaining between the slots become higher. It is noted with regard to the schematic representation that this increase of the remaining strips would have to be less than the enlargement of the depth of the slots in order to obtain a "convexity" of the bearing. It can also be provided that, as is shown, the surface line 18 which connects the tips of the strips remains parallel to the friction bearing axis, which can be set by a suitable combination of the change in the radial extension and the change in the feed rate.

Finally, in FIG. 2 an equally conceivable embodiment is shown with which firstly the radial extension of the tool (not shown) is enlarged such that the bottoms of the slots 12 are located on a surface line which slopes with respect to a surface line 22 parallel to the friction bearing axis (horizontal in FIG. 2). During machining the axial feed rate is increased so comprehensively that a surface line 18, on which the tips 24 of the strips are located between the slots 12, increases compared to the surface line 22 parallel to the axis. In other words, a concave arrangement of the tips 24 of the strips results. During operation, these strips are leveled and flattened to the extent that according to FIG. 2 the flattened strips can even be located below the surface line 22 parallel to the axis, and thus a practical contour with convexly arranged, flattened strips and far-apart slots 12 results.

The invention claimed is:

1. A method for producing a friction bearing, in which, while machining the entire width of an inner surface, both a radial extension and a feed rate in the axial direction of at least one tool are changed during machining, such that the width of grooves formed thereby changes in the axial direction.

2. The method according to claim 1, in which the radial extension and the feed rate are changed at least sometimes simultaneously.

3. The method according to claim 1, in which the radial extension and the feed rate are changed at least sometimes successively.

4. The method according to claim 1, in which the radial extension and/or the feed rate is changed at least at times with each rotation of the tool rotating in the friction hearing (part).

5. The method according to claim 1, wherein the radial extension of the tool is increased during machining of at least one axial edge area.

6. The method according to claim 1, wherein the radial extension of the tool is reduced during machining of at least of one axial edge area.

7. The method according to claim 1, wherein during machining the feed rate in the axial direction is increased in at least one axial edge area.

8. The method according to claim 1, wherein slots or grooves extending in the circumferential direction are formed using the tool, which in an axial central area have a depth of approximately 1.7 µm to 2.1 µm and, in particular, approximately 1.9 µm, and/or in an axial edge area have a depth of approximately 5.6 µm to 6.0 µm and in particular approximately 5.8 µm.

9. The method according to claim 1, wherein slots or grooves extending in the circumferential direction are formed using the tool, which have a width or a center distance of approximately 0.27 mm to 0.31 mm and in particular approximately 0.29 mm in an axial central area and/or of 0.49 mm to 0.53 mm and in particular approximately 0.51 mm in at least one axial edge area.

10. The method according to claim 1, wherein the inner surface is subsequently galvanically coated using a PVD process, sputtering or with a polymer lacquer.

* * * * *

UNITED STATES PATENT AND TRADEMARK OFFICE
CERTIFICATE OF CORRECTION

PATENT NO. : 9,937,564 B2  
APPLICATION NO. : 14/647188  
DATED : April 10, 2018  
INVENTOR(S) : Philippe Damour Page 1 of 1

It is certified that error appears in the above-identified patent and that said Letters Patent is hereby corrected as shown below:

In the Claims

Column 6 Line 6, remove "hearing" and replace with "bearing"

Signed and Sealed this
Twenty-fifth Day of September, 2018

Andrei Iancu
*Director of the United States Patent and Trademark Office*